United States Patent
Thomas (10) Patent No.: US 6,565,114 B1
(45) Date of Patent: May 20, 2003

(54) PLASTIC AIR BAG MODULE WITH VARIABLE CUSHION VENT AREA ADJUSTMENT

(75) Inventor: Scott David Thomas, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/993,282

(22) Filed: Nov. 6, 2001

(51) Int. Cl.⁷ .............................................. B60R 21/20
(52) U.S. Cl. .................... 280/728.2; 280/739; 280/740; 280/743.2
(58) Field of Search ............................ 280/728.2, 732, 280/740, 743.2, 728.1, 739, 736, 742

(56) References Cited

U.S. PATENT DOCUMENTS

| | | | | |
|---|---|---|---|---|
| 5,556,127 A | * | 9/1996 | Hurford et al. ........... | 280/728.2 |
| 5,876,060 A | * | 3/1999 | Davidson et al. ........ | 280/728.2 |
| 5,884,939 A | * | 3/1999 | Yamaji et al. .............. | 280/732 |
| 6,056,313 A | * | 5/2000 | Lutz et al. ................ | 280/728.2 |
| 6,168,185 B1 | | 1/2001 | Ross ........................ | 280/728.2 |
| 6,173,988 B1 | * | 1/2001 | Igawa ...................... | 280/728.2 |
| 6,189,915 B1 | | 2/2001 | Soderquist et al. ...... | 280/728.2 |
| 6,334,627 B1 | * | 1/2002 | Heym et al. ............. | 280/743.2 |
| 2001/0000015 A1 | | 3/2001 | Igawa et al. | |
| 2001/0000418 A1 | | 4/2001 | Kreile | |
| 2002/0050701 A1 | * | 5/2002 | Amamori ................. | 280/728.2 |

* cited by examiner

Primary Examiner—Peter C. English
(74) Attorney, Agent, or Firm—Laura C. Hargitt (57) ABSTRACT

There is disclosed a housing assembly for an air bag system with a gas emitting inflator for emitting inflation gas. The housing assembly includes a support structure for retaining the gas emitting inflator within the structure and to a vehicle if the gas emitting inflator auto-ignites upon exposure to extreme conditions.

13 Claims, 8 Drawing Sheets

Fig-5

PLASTIC AIR BAG MODULE WITH VARIABLE CUSHION VENT AREA ADJUSTMENT

TECHNICAL FIELD

The present invention relates to an automotive vehicle air bag system housing.

BACKGROUND OF THE INVENTION

Air bag systems in automotive vehicles generally include an air bag that is designed to deploy toward a seat of the automotive vehicle when triggered by a sensor signal. A gas emitting inflator attached to an air bag cushion is generally used in the deployment of an air bag. In designing air bag systems, one design consideration is to retain the gas emitting inflator during auto-ignition if the air bag system is exposed to extreme conditions. The present invention provides another improved air bag system design.

SUMMARY OF THE INVENTION

The present invention provides a housing assembly for supporting and retaining an air bag system within a vehicle. Accordingly, there is disclosed an air bag system with a gas emitting inflator for emitting inflation gas. An air bag is in fluid communication with the inflator. A housing assembly is formed by a support structure for retaining the gas emitting inflator. A housing container is attached to the retaining support structure and supports the gas emitting inflator within the housing assembly. A girdle is attached to the housing container, opposite the retainer support structure, for supporting the gas emitting inflator. The retaining support structure and girdle are formed of a first material, such as a metal stamping. The housing container is formed of a second material, having a high strength to weight ratio to maintain a lightweight assembly. The structural features are incorporated into the housing assembly to help ensure inflator retention during inflator auto-ignition in an event where the non-ferrous housing container has degraded prior to inflator auto-ignition.

These and other objects of the present invention will become apparent upon reading the following detailed description in combination with the accompanying drawings, which depict systems and components that can be used alone or in combination with each other in accordance with the present invention.

DESCRIPTION OF THE PREFERRED EMBODIMENT

The present invention relates to a housing for an air bag system within a vehicle.

Air bag systems generally include an air bag, a gas emitting inflator for emitting inflation gas into the air bag upon a triggering signal from a triggering sensor or system, and a housing assembly for storing the air bag prior to deployment and a deployment door.

The housing assembly is formed to support an air bag system having one or more tether elements attached to an air bag and to another portion of the system for restraining the deployment of the air bag when a more restrained deployment is desired. The housing also provides for a moveable member assembly used to selectively release the one or more tether elements for a less restrained deployment of the air bag when such deployment is desired. The housing provides for the moveable member to selectively cover vent openings within the housing to allow more or less gas to be emitted into the air bag.

Figure 1A:
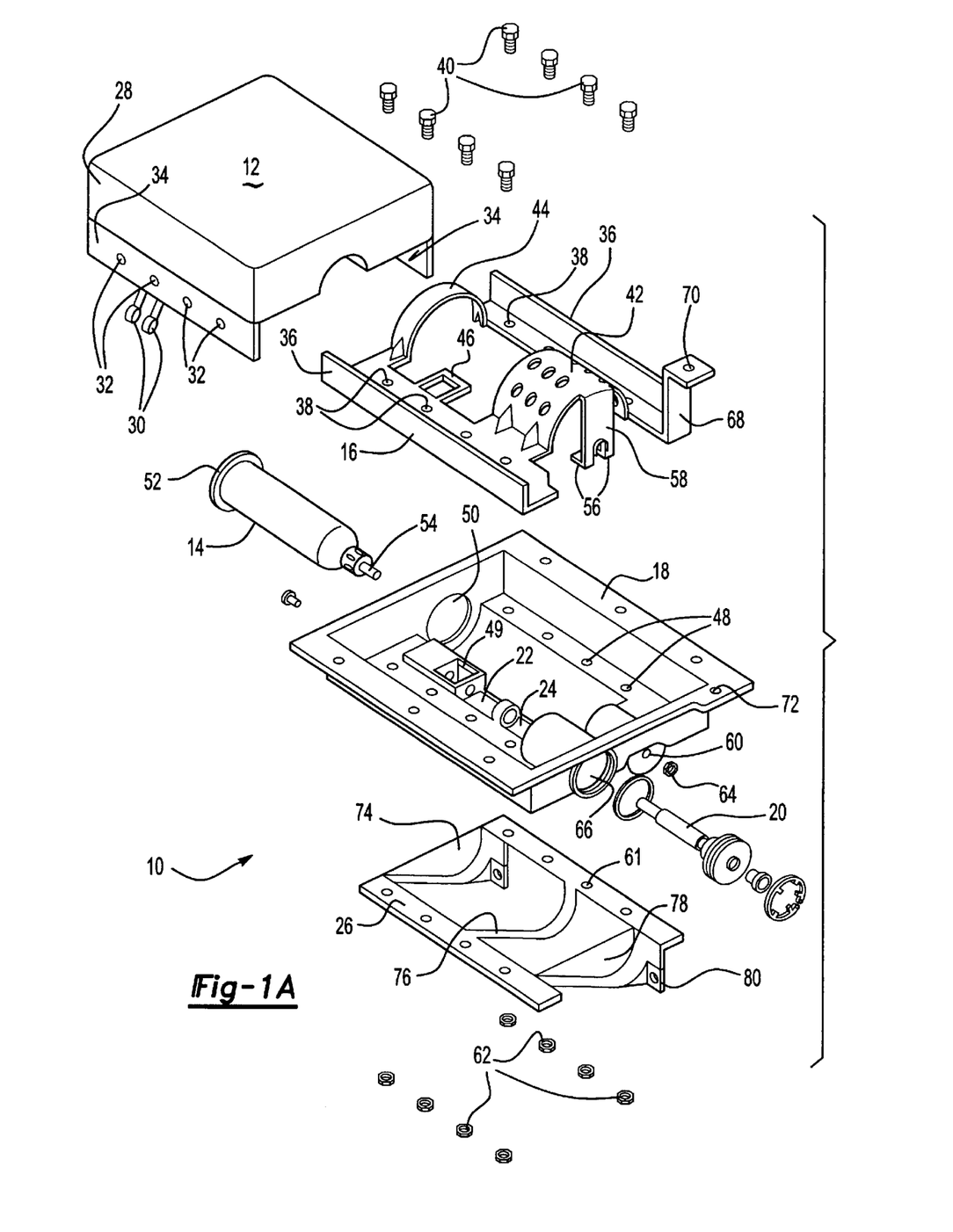
FIGS. 1(a)–1(d) illustrate an exploded view of an air bag system illustrating the housing assembly with particular attention to the inflator retaining features provided on the support structure.

Referring to FIG. 1(a), there is shown an air bag system housing 10 for supporting an air bag 12 and a cylindrical gas emitting inflator 14 for releasing gas into the air bag 12. A three-dimensional unitary support structure 16 retains the gas emitting inflator 14 within the air bag system housing 10 and supports the air bag 12 in its non-deployed state above the inflator 14 to form the upper portion of the housing 10. The support structure 16 is suitably fabricated from a first material, and more preferably is metal stamping.

A three-dimensional unitary housing container 18 is adapted to support the inflator 14 and also provides for seating of the support structure 16 within the container 18. The container 18 also supports a moveable member assembly 20 that upon translation selectively releases the air bag tethers 30 while selectively covering vent opening 24 and uncovering vent opening 22 provided within the housing container 18 to allow a gas to be emitted into the air bag 12. The housing container 18 is preferably molded or formed from a second material that is preferably a non-ferrous material, and more preferably is plastic.

A mask-like girdle 26 forms the lower portion of the housing 10 and is attached to the housing container 18 and support structure 16. The girdle 26 also provides support for the inflator 14 and, like the support structure 16, is preferably formed by a metal stamping. The support structure 16 and girdle 26 combine to support and surround the inflator 14 during inflator auto-ignition when the non-ferrous housing container 18 has degraded prior to inflator auto-ignition.

The housing 10 is formed to support the air bag 12 having a cushion 28 with tethers 30 and a multiplicity of holes 32 along flaps 34 of both sides of the air bag 12. Retainers, such as studs 40 or the like fasteners, are pressed through hoes 38 of the support structure 16 and through holes 32 along flaps 34 of the air bag 12. The cushion 28 is folded and placed over the support structure 16. The flaps 34 on the cushion 28 are folded around the edges 36 of the support structure 16 to mate with holes 38 in the underside of the support structure 16. A perforated semi-cylindrical rigid diffuser 42, a rigid semi-cylindrical strap 44 and optional protrusion 46 on the support structure 16 help prevent the cushion 28 from sagging into the housing 10 and interfering with the inflator 14 and moveable member 20.

The support structure 16 with attached air bag 12 is then dropped into housing container 18 so that the studs 40 protrude through holes 48 within the bottom of housing container 18. Tethers 30, having previously been slipped through optional protrusion 46 of support structure 16, are inserted through opening 49. The inflator 14 is inserted through opening 50 in the housing container 18 until the inflator flange 52 contacts the outer edge of opening 50. At this location, an inflator stud 54 protrudes through a reinforced retaining member 56 on a rigid downward flange 58 provided on the support structure 16 and through hole 60 in the housing container 18.

The girdle 26 is mounted to the underside of the housing container 18 opposite the support structure 16. The girdle 26 is provided with mounting holes 61 in periphery flanges generally for matching holes 48 within the housing container 18. Studs 40 protrude through these mounting holes 61 and are secured by nuts 62 thereby tightening the housing 10 together. The inflator nut 64 is then screwed onto the inflator stud 54 tightening the inflator 14 to the support structure 16 and the housing 10. Additional spaced cross members 74,76, 78 may be provided in girdle 26, effectively as walls or restraints, to aid in retaining the inflator 14 within the housing 10 if the housing container 18 is degraded and the inflator 14 auto ignites. Optional attachment member 80, (preferably having an aperture for receiving a fastener,) in girdle 26 may be provided as an attachment or attachment reinforcement of housing 10 to a vehicle.

The moveable member assembly 20 is inserted into the opening 66 in the housing container 18 and tethers 30 of cushion 28. The moveable member assembly 20 may restrain the deployment of the cushion 28 by not releasing the tethers 30 and allowing gas from the inflator 14 to vent through opening 24. Alternatively, actuation of the moveable member assembly 20 will release tethers 30 for full deployment of cushion 28, closing vent opening 24 and opening vent opening 22. This allows for low pressure ride-down venting after inflation of the air bag cushion 28.

Attachment member 68, shown as a flange on support structure 16, may be provided for securing the support structure 16 surrounding the inflator 14 to a vehicle. Attachment member 68 has an opening 70 matching an opening 72 on housing container 18 for a stud to be inserted and secured to a vehicle by a fastener (e.g., a nut) for instance.

Figure 1B:
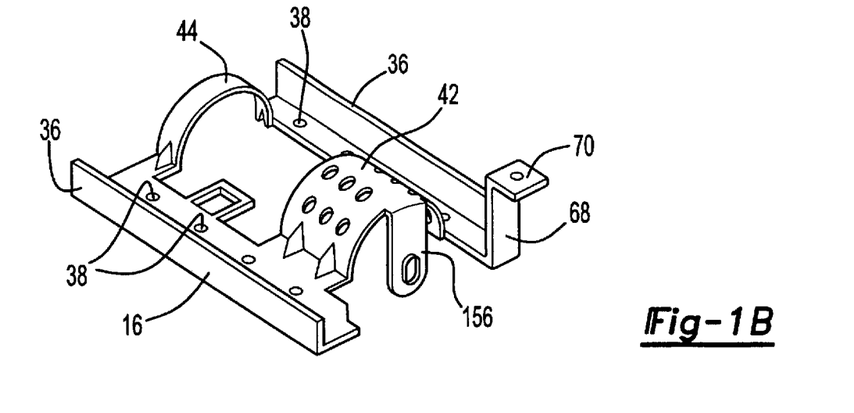

An alternative reinforced retaining member 156 is illustrated in FIG. 1(b) and may be used in place of the reinforced retaining member (slot 56) within flange 58 to retain inflator 14 to support structure 16.

Figure 1C:
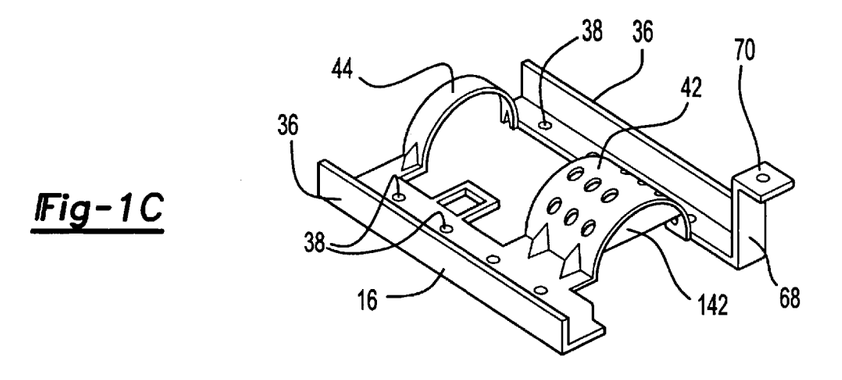
Figure 1D:
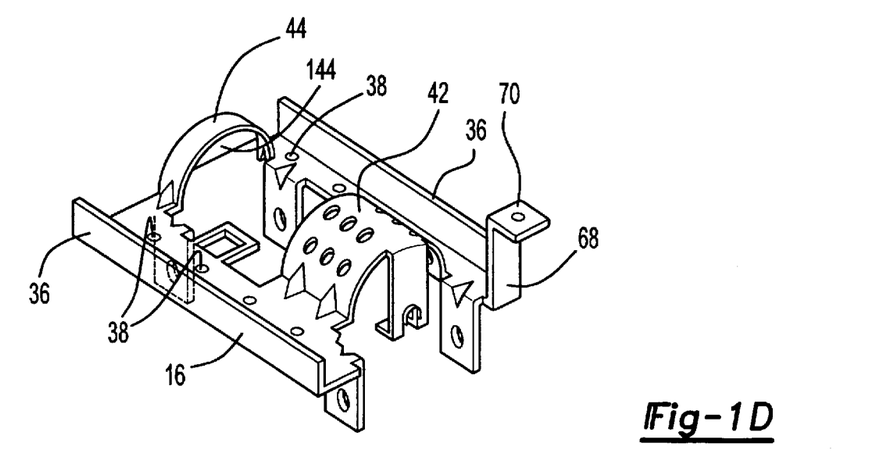

FIGS. 1(c) and 1(d) illustrate optional additional wall sections 142,144 supported by the diffuser 42 and strap 44, respectively, to aid in retaining the inflator 14 within the support structure 16 and housing 10.

Figure 2A:
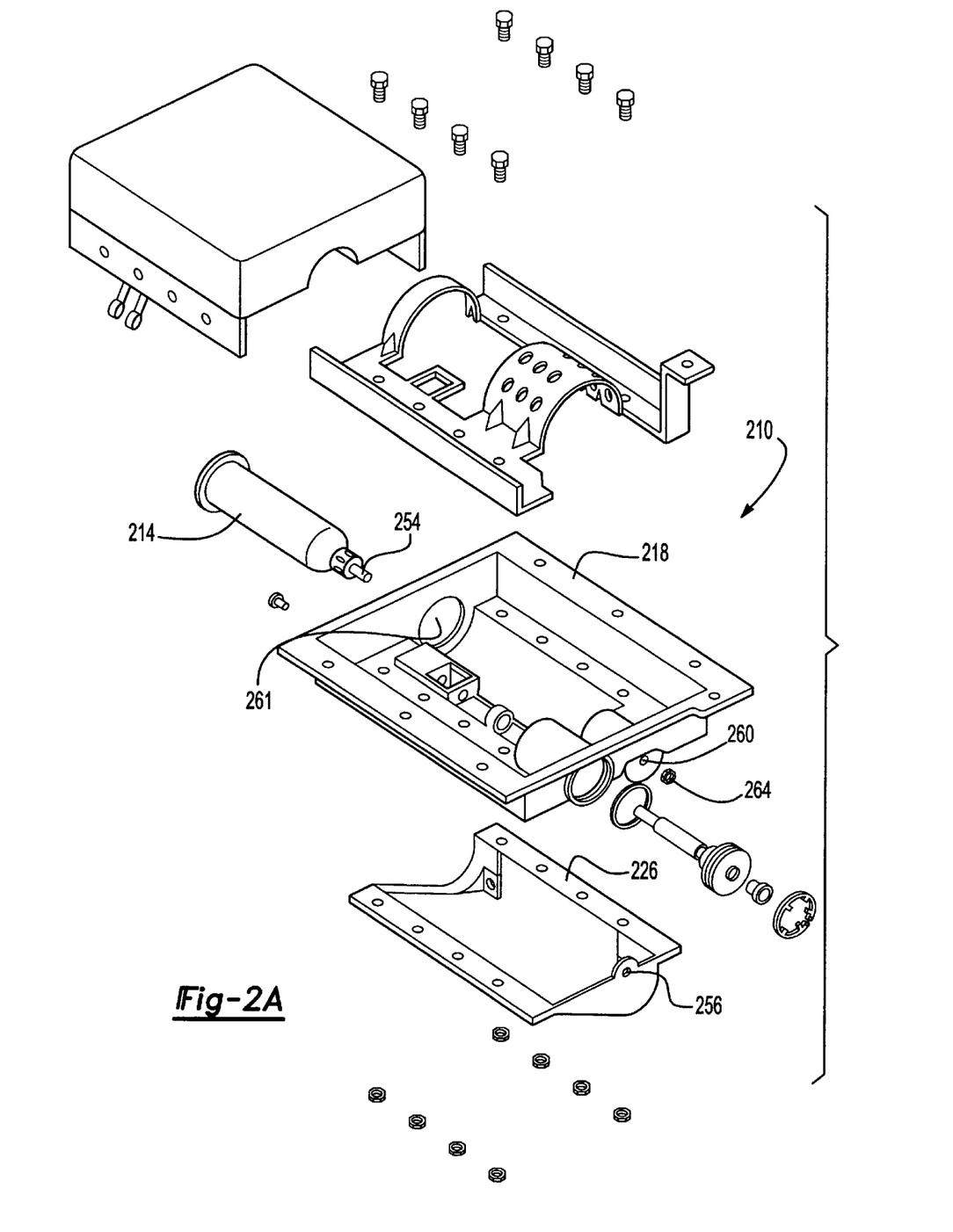
FIGS. 2(a)–2(c) illustrate an exploded view of an alternative housing assembly with particular attention to the inflator retaining features provided on the girdle.

FIG. 2(a) illustrates an exploded view of an alternative housing assembly having an additional inflator retaining hole 256 provided on the girdle 226. Reinforced retaining member 257 (FIG. 2(b)) retains the inflator 214 within the housing 210. The inflator 214 is secured to the girdle 226 through openings 260 and 261 in housing container 218, opening 256 in girdle 226 and opening 258 in retaining member 257 (FIG. 2(b).) An inflator nut 264 is then screwed onto the inflator stud 254 tightening the inflator 214 to the girdle 226 and the housing 210.

Figures 2B, 2C:
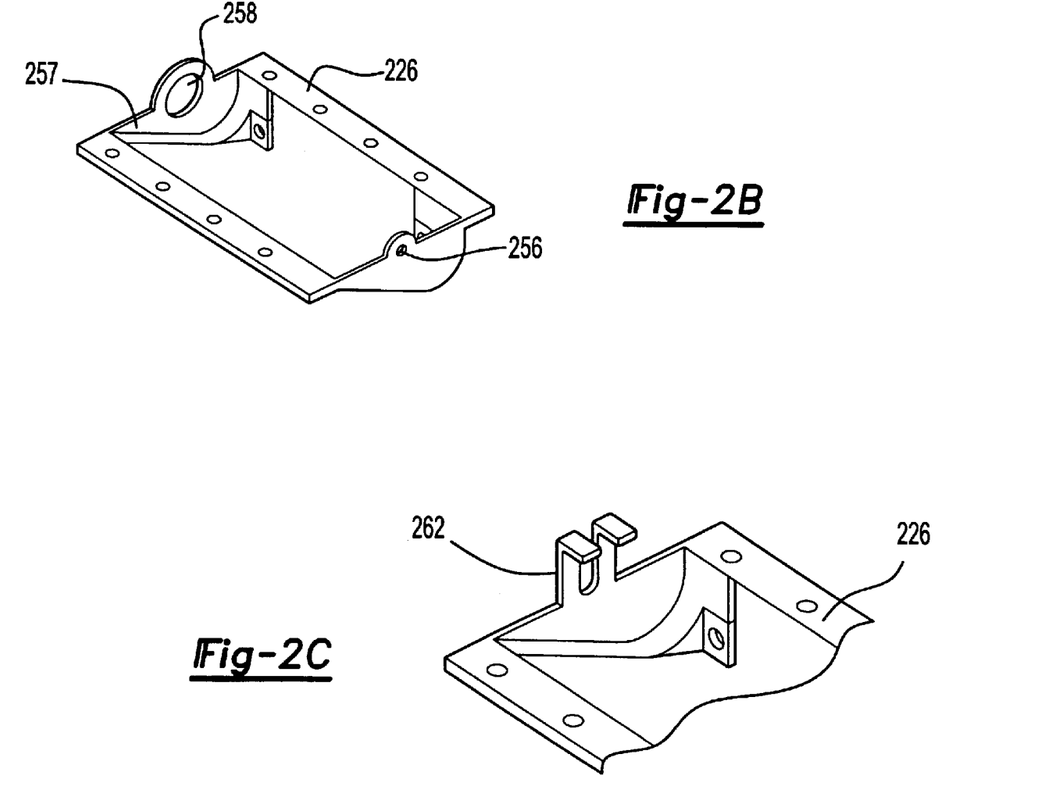

An alternative reinforced retaining member 262 is illustrated in FIG. 2(c) and may be used in place of the reinforced retaining member 257 to retain inflator 214 to girdle 226.

Figure 3:
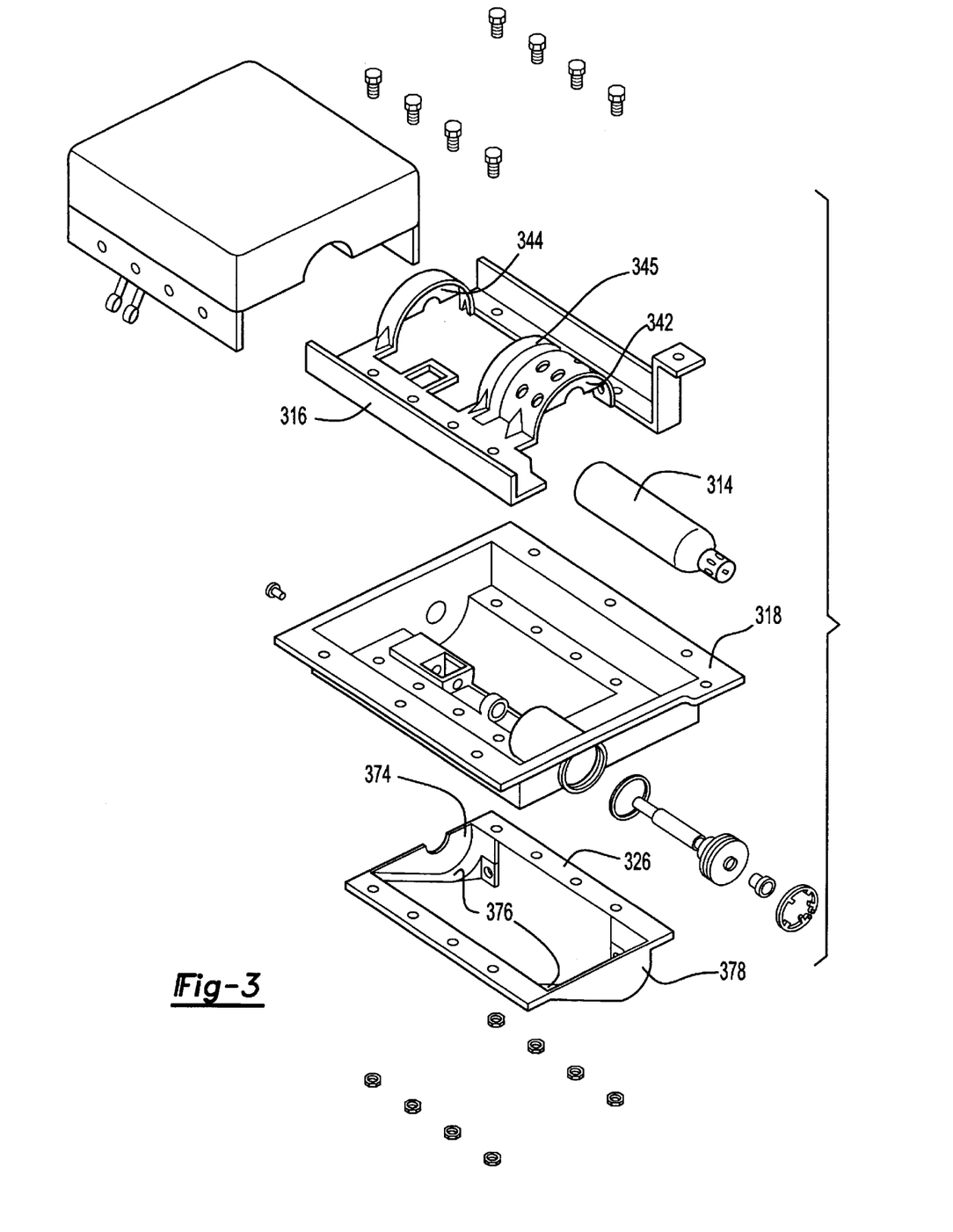
FIG. 3 illustrates a plan view of an optional inflator retainer of a support structure for retaining the inflator within a housing assembly.
Figure 4A:
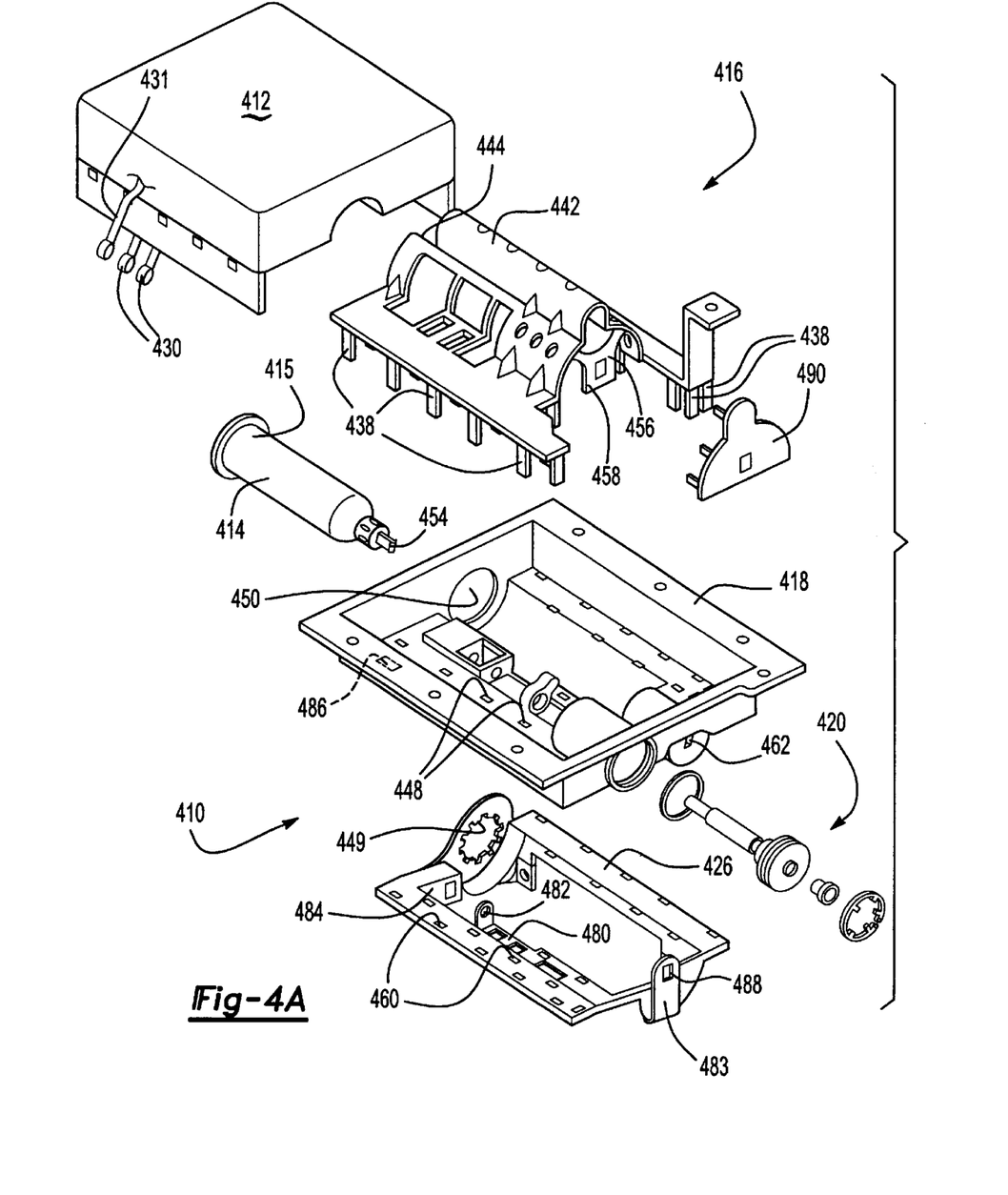
FIGS. 4(a)–4(e) illustrate an exploded view of an alternative housing assembly with particular attention to the inflator retaining features and attachment members provided on the support structure and girdle.

FIGS. 3 and 4(a) illustrate an alternative housing assembly for retaining the inflator. In FIG. 3, the inflator 314 is seated within housing container 318. Support structure 316 is provided with flanges 342, 344 and strap 345. Girdle 326 is provided with flanges 374,378 and bottom 376. These additional members encase and support the inflator 314 when housing container 318 is degraded and the inflator 314 auto ignites.

FIG. 4(a) illustrates a support structure 416 having an alternative diffuser 442 and strap 444 for supporting cushion 412 in housing 410. Support structure 416 is provided with flanges 438 for securing the girdle 426 to the housing container 418. When the support structure 416 is seated in the housing container 418, flanges 438 extend through openings 448 in housing container 418 and openings 460 in girdle 426. The flanges 438 may be folded to secure and tighten the housing 410. Alternative routing of the tethers 430 may be provided in the girdle 426 at 480 where moveable member assembly 420 is located through opening 482 and secured to the girdle 426 at flange 484. An additional tether 431 may also be provided for additional profile restraint of air bag cushion 412 and may be routed through the housing container 418 at opening 486 and is received by the moveable member assembly 420 in the girdle 426.

FIG. 4(a) also illustrates alternative attachment interfaces of the inflator 414 within the housing 410. After the inflator 414 is inserted through opening 450 in the housing container 418, the inflator stud 454 protrudes through a reinforced retaining member 456 on the downward flange 458 provided on the support structure 416 and through hole 462 in the housing container 418. An additional reinforced retaining member 488 on an upward flange 483 is provided on the girdle 426. If desired, an additional retainer 490 may be provided to support the inflator stud 454 within the housing 410. Various ways to secure the inflator stud 454 to the housing 410 are there shown. These additional members help encase and support the inflator 414 if housing container 418 is degraded and the inflator 414 auto ignites.

Additionally, FIG. 4(a) illustrates an inflator fixation method to the girdle 426. The inflator body 415 can be pressed into the tabs 449 on the girdle 426.

Figure 4B:
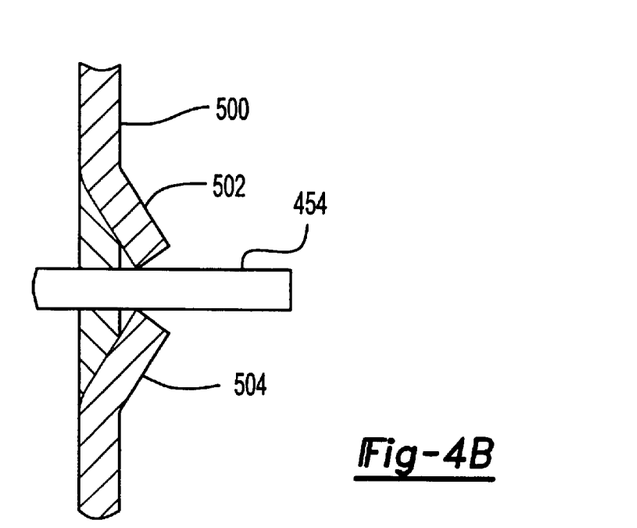

FIG. 4(b) illustrates an inflator fixation method to the girdle 426, support structure 416, or additional retainer 490 as shown generally at 500. The inflator stud 454 is pressed between the bent tabs 502, 504.

Figures 4C, 4D:
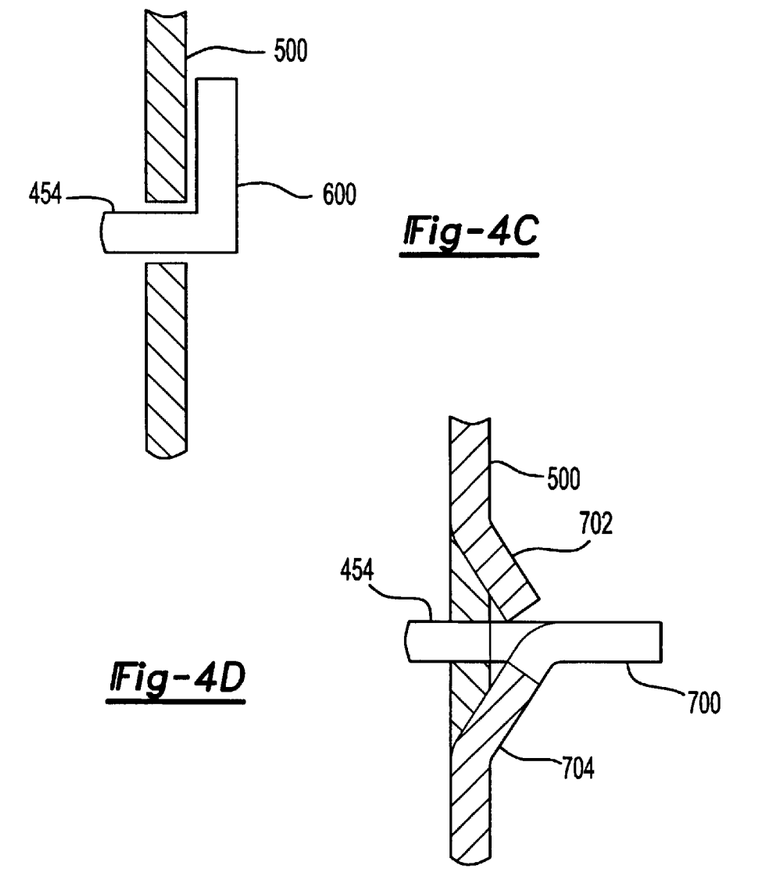

FIG. 4(c) illustrates yet another inflator fixation method to the girdle 426, support structure 416, or additional retainer 490 as shown generally at 500. The inflator stud 454 is bent so that portion 600 retains the inflator stud 454.

FIG. 4(d) illustrates yet another inflator fixation method to the girdle 426, support structure 416, or additional retainer 490 as shown generally at 500. The inflator stud 454 has a portion 700 that locks into tabs 702 and 704.

Figure 4E:
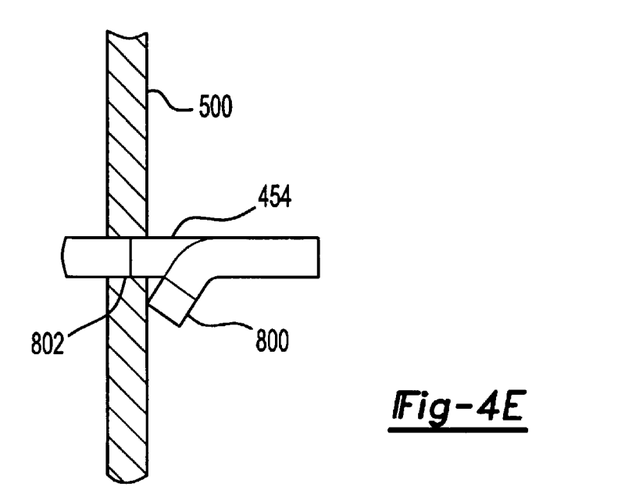

FIG. 4(e) illustrates yet another inflator fixation method to the girdle 426, support structure 416, or additionally retainer 490. The inflator stud 454 has a portion 800 that locks into hole 802.

Figure 5:
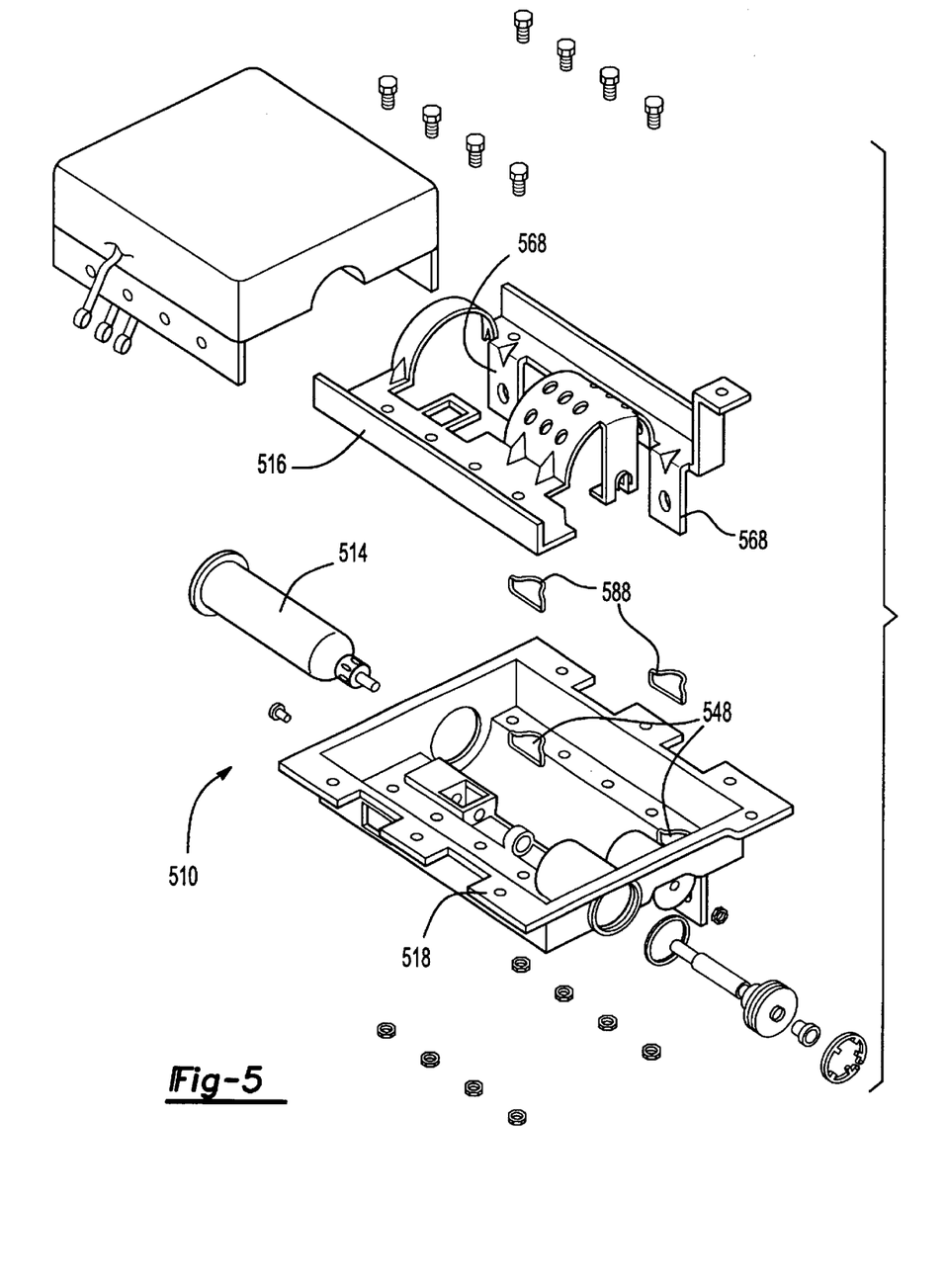
FIG. 5 illustrates an exploded view of an alternative housing assembly with particular attention to the attachment members provided on the support structure for securing to a vehicle.

FIG. 5 illustrates housing 510 having a support structure 516 identical to that shown in FIG. 1. Additional attachment members 568 are provided for securing the support structure 516 with inflator 514 to a vehicle. In this embodiment, the girdle is eliminated and the housing container 518 is provided with additional openings 548 for attachment members 568. Seals 588 may be seated within the openings 548 for sealing the attachment members 568 within the openings 548.

The person of skill in the art will recognize that features and aspects of a housing for supporting an air bag system disclosed herein may be used in any combination described as desired, needed or as may be possible.

It should be understood that the invention is not limited to the exact embodiment or construction that has been illustrated and described but that various changes may be made without departing from the spirit and the scope of the invention.

What is claimed is:

1. A housing for supporting an air bag system within a vehicle comprising a cylindrical gas emitting inflator for emitting inflation gas and an air bag for receiving the inflation gas, said housing comprising:
    a three-dimensional unitary metal support structure for helping to retain said gas emitting inflator within said housing, said support structure having a perforated, semi-cylindrical diffuser and a semi-cylindrical strap for assisting in supporting said air bag and having a flange extending downward from said diffuser for securing said gas emitting inflator to said support structure;
    a three dimensional unitary plastic housing container fixedly attached to said support structure and supporting said gas emitting inflator within said housing, said housing container including a first vent opening and a second vent opening;
    a metal girdle fixedly attached to said housing container opposite said support structure and assisting in supporting said gas emitting inflator wherein said support structure and said girdle combine to surround said inflator; and
    a moveable member assembly inserted through at least one opening in said housing container and through at least one tether of said air bag, said moveable member assembly also covering said first vent opening, wherein said moveable member assembly is selectively actuated to release said at least one tether and cover said second vent opening.

2. The housing as defined in claim 1, said girdle further comprising a retaining member for retaining said gas emitting inflator within said housing if said air bag system is degraded.

3. The housing as defined in claim 1, and further comprising an attachment member for securing said support structure to a vehicle.

4. The housing as defined in claim 1, wherein said support structure is formed of a metal stamping.

5. The housing as defined in claim 1, further comprising a cavity for retaining the moveable member assembly.

6. The housing as defined in claim 1, wherein said girdle is formed of a metal stamping.

7. The housing as defined in claim 6, wherein said girdle further comprises an attachment member for securing said girdle to a vehicle.

8. An air bag module housing assembly for housing an air bag system within a vehicle, said air bag system comprising a gas emitting inflator for emitting inflation gas and an air bag in fluid communication with said inflator, said housing assembly comprising:
    a three dimensional unitary metal support structure having a rigid semi-cylindrical strap and a perforated, semi-cylindrical rigid diffuser for supporting said air bag about said inflator and forming an upper portion of said housing assembly; wherein said diffuser further comprises a downwardly extending rigid flange having means for attaching said inflator to said support structure;
    a three dimensional unitary plastic housing container fixedly attached to said support structure and supporting said gas emitting inflator within said housing assembly, said housing container including a first vent opening and a second vent opening;
    a metal girdle forming a lower portion of said housing assembly and removably attached to said support structure, said girdle cradling and fixedly containing said gas emitting inflator, said girdle and said support structure combining to retain and substantially entirely surround said gas emitting inflator within said housing assembly, said girdle further comprising an attachment member for securing said girdle with said gas emitting inflator to said vehicle;
    retainers pressed through holes of the support structure, holes of the air bag, holes in the housing container and holes in the girdle thereby maintaining the housing container substantially between the support structure and the girdle; and
    a moveable member assembly inserted through at least one opening in said housing container and through at least one tether of said air bag, said moveable member assembly also covering said first vent opening, wherein said moveable member assembly is selectively actuated to release said at least one tether and cover said second vent opening.

9. The housing assembly as defined in claim 8, wherein said girdle is formed of a metal stamping.

10. The housing assembly as defined in claim 8, further comprising a cavity for retaining the moveable member assembly.

11. An air bag module housing assembly for housing an air bag system within a vehicle, said air bag system comprising a gas emitting inflator for emitting inflation gas and an air bag in fluid communication with said inflator, said housing assembly comprising:
    a three dimensional unitary metal support structure having a rigid semi-cylindrical strap and a perforated, semi-cylindrical rigid diffuser for supporting said air bag about said inflator and forming an upper portion of said housing assembly; wherein said diffuser further comprises a downwardly extending rigid flange having means for attaching said inflator to said support structure;
    a three dimensional unitary plastic housing container fixedly attached to said support structure and supporting said gas emitting inflator within said housing assembly, said housing container including a first vent opening and a second vent opening;
    a metal girdle forming a lower portion of said housing assembly and removably attached to said support structure, said girdle cradling and fixedly containing said gas emitting inflator, said girdle and said support structure combining to retain and substantially entirely surround said gas emitting inflator within said housing assembly, said girdle further comprising an attachment member for securing said girdle with said gas emitting inflator to said vehicle;
    flanges extending from the support structure, the flanges pressed through holes of the air bag, holes in the housing container and holes in the girdle thereby maintaining the housing container substantially between the support structure and the girdle;

a retainer for assisting in supporting a stud of the inflator; and a moveable member assembly inserted through at least one opening in said housing container and through at least one tether of said air bag, said moveable member assembly also covering said first vent opening, wherein said moveable member assembly is selectively actuated to release said at least one tether and cover said second vent opening.

12. The housing assembly as defined in claim 11, further comprising a cavity for retaining the moveable member assembly.

13. The housing assembly as defined in claim 11, wherein said second vent opening is directly below said diffuser.

* * * * *